United States Patent
Jeon

(10) Patent No.: US 8,055,413 B2
(45) Date of Patent: Nov. 8, 2011

(54) METHOD FOR COMPENSATING HYDRAULIC PRESSURE OF AUTOMATIC TRANSMISSION

(75) Inventor: Byeong Wook Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1004 days.

(21) Appl. No.: 11/952,357

(22) Filed: Dec. 7, 2007

(65) Prior Publication Data

US 2009/0111650 A1    Apr. 30, 2009

(30) Foreign Application Priority Data

Oct. 26, 2007   (KR) ................. 10-2007-0108351

(51) Int. Cl.
 *G06F 19/00*   (2011.01)
(52) U.S. Cl. ............. 701/51; 303/116.1; 303/114.1; 303/113.1; 303/113.2; 303/113.4; 180/197; 60/547.1; 91/420; 91/518; 415/1; 415/9; 415/10; 188/358
(58) Field of Classification Search .......... 701/51; 303/116.1, 10, 114.1, 113.1, 113.2, 113.4, 303/122.01, 156, 113.5, 114.3, 186, 115.4; 180/197; 60/547.1; 91/420, 518; 415/1, 415/9, 10; 188/358
See application file for complete search history.

(56) References Cited

U.S. PATENT DOCUMENTS

| | | | | |
|---|---|---|---|---|
| 4,981,052 | A * | 1/1991 | Gierer | 477/125 |
| 5,803,866 | A * | 9/1998 | Tsukamoto et al. | 477/132 |
| 5,954,776 | A * | 9/1999 | Saito et al. | 701/51 |
| 6,634,987 | B2 * | 10/2003 | Jeon | 477/114 |
| 6,832,977 | B2 * | 12/2004 | You | 477/161 |
| 7,214,162 | B2 * | 5/2007 | Shimada | 477/107 |
| 7,247,126 | B2 * | 7/2007 | Shim et al. | 477/148 |
| 7,274,987 | B2 * | 9/2007 | Ishiguro | 701/123 |
| 2005/0125134 | A1 * | 6/2005 | Iwatsuki et al. | 701/70 |
| 2005/0239597 | A1 * | 10/2005 | Shimada | 477/107 |
| 2005/0267665 | A1 * | 12/2005 | Iwatsuki et al. | 701/70 |

FOREIGN PATENT DOCUMENTS

| KR | 1020020044464 A | 6/2002 |
|---|---|---|
| KR | 1020020045491 A | 6/2002 |

* cited by examiner

*Primary Examiner* — James Trammell
*Assistant Examiner* — McDieunel Marc
(74) *Attorney, Agent, or Firm* — Morgan, Lewis & Bockius LLP

(57) ABSTRACT

Faster shifting operation and reduced shift shock in response to a braking operation during a lift-foot-up shifting may be achieved when an automatic transmission is controlled by a method for compensating a hydraulic pressure that includes: determining whether a lift-foot-up shifting of the automatic transmission is under control; calculating a vehicle speed of a vehicle; calculating a deceleration rate of the vehicle; calculating a compensation hydraulic pressure to be applied to a friction member of the transmission, based on the deceleration rate; calculating a on-coming pressure based on the calculated compensation hydraulic pressure; and applying the calculated on-coming pressure to the friction member.

8 Claims, 4 Drawing Sheets

METHOD FOR COMPENSATING HYDRAULIC PRESSURE OF AUTOMATIC TRANSMISSION

CROSS-REFERENCE TO RELATED APPLICATION

This application claims priority to and the benefit of Korean Patent Application No. 10-2007-0108351, filed in the Korean Intellectual Property Office on Oct. 26, 2007, the entire contents of which are incorporated herein by reference.

BACKGROUND OF THE INVENTION (a) Field of the Invention

The present invention relates to a method for compensating a hydraulic pressure of an automatic transmission. More particularly, the present invention relates to a method for compensating a hydraulic pressure of an automatic transmission that reduces shift shock and increase shifting speed.

(b) Description of the Related Art

When a brake is operated while a lift-foot-up shift is performed, a time required for a turbine speed of an automatic transmission to reach a synchronization speed is increased. Therefore, a shifting time is increased.

In this case, a shift shock may increase, and a delay may occur in response to a re-acceleration.

FIG. 4 illustrates a conventional scheme of a method for compensating a hydraulic pressure of an automatic transmission.

Several terms relating to shifting control is explained below

When it is determined that a shift is required on the basis of a vehicle speed and throttle valve opening, a transmission control unit (TCU) starts a required shift control by starting control of a solenoid valve in the AT, which is usually called "shift-start point" and is abbreviated as "SS point".

By starting of the solenoid valve control, after a certain period, an off-going friction member begins releasing its hydraulic pressure, and an on-coming element begins to be supplied with a hydraulic pressure, which is usually called "shift-begin point" and is abbreviated as "SB point". The period after the SS point to the SB point becomes a delay period which is not used for an actual shifting operation of the automatic transmission ("AT").

So, an actual shifting period (also called an inertia phase) of the AT begins at the SB point and finishes at a time point at which the off-going element is fully disengaged and the on-coming element is fully engaged. Such a time point at which the off-going element is fully disengaged and the on-coming element is fully engaged is usually called "shift-finish point" and is abbreviated as "SF point".

As shown in FIG. 4, an opening of a throttle valve Th is zero percent (0%) at the shift-start (SS) point, since the accelerator pedal is in a lift-foot-up state. At this time if a brake is operated, the shifting operation is performed as follows.

A turbine speed Nt gradually decrease from the shift-start point SS, and it is abruptly synchronized to a synchronization speed near the shift-finish point SF1.

An output shaft rotation speed No decreases after when a brake is operated, since the vehicle speed decreases by the braking operation. Then, a conventional on-coming hydraulic pressure Pr that is supplied to an on-coming friction member (e.g., a clutch or a brake) in the automatic transmission linearly increases with a first-order slope hydraulic pressure Pg for a predetermined period before the shift-finish point SF1. The on-coming hydraulic pressure Pr is controlled to abruptly increase at the shift-finish point SF1.

However, according to the above conventional shifting operation, the time for the turbine speed Nt to reach the synchronization speed Ns is long, since the gradient of the conventional on-coming pressure Pr applied to the friction member is applied the same till the shift-finish point SF1. In addition, a large shift shock may occur since the turbine speed Nt may be abruptly changed to the synchronization speed Ns at the shift-finish point SF1.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for compensating a hydraulic pressure of an automatic transmission having advantages of faster shilling operation and reduced shift shock in response to a braking operation during a lift-foot-up shifting.

An exemplary embodiment of the present invention provides a method for compensating a hydraulic pressure of an automatic transmission, comprising: determining whether a lift-foot-up shifting of the automatic transmission is under control; determining whether a brake is operated; calculating a vehicle speed of a vehicle; calculating a deceleration rate of the vehicle; calculating a compensation hydraulic pressure to be applied to a friction member of the automatic transmission, based on the deceleration rate of the vehicle; calculating a on-coming pressure based on the calculated compensation hydraulic pressure; and applying the calculated on-coming pressure to the friction member immediately or in a predetermined time after the detection of the deceleration of the vehicle.

The on-coming pressure may be determined by summation of a base hydraulic pressure, first-order slope hydraulic pressure and the compensation hydraulic pressure.

The calculating of the vehicle speed may include: detecting an output shaft rotation speed of the automatic transmission; and calculating the vehicle speed based on the detected output shaft rotation speed.

The calculating of the deceleration rate may include: detecting a rotation speed decrease rate of an output shall of the automatic transmission; and calculating the deceleration rate based on the rotation speed decrease rate.

The friction member may be a hydraulic clutch or a hydraulic brake provided in the automatic transmission.

The compensation hydraulic pressure may increase as the deceleration rate increases.

The compensation hydraulic pressure may monotonically increase as the deceleration rate increases.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF REFERENCE NUMERALS INDICATING PRIMARY ELEMENTS IN THE DRAWINGS

Figure 1:
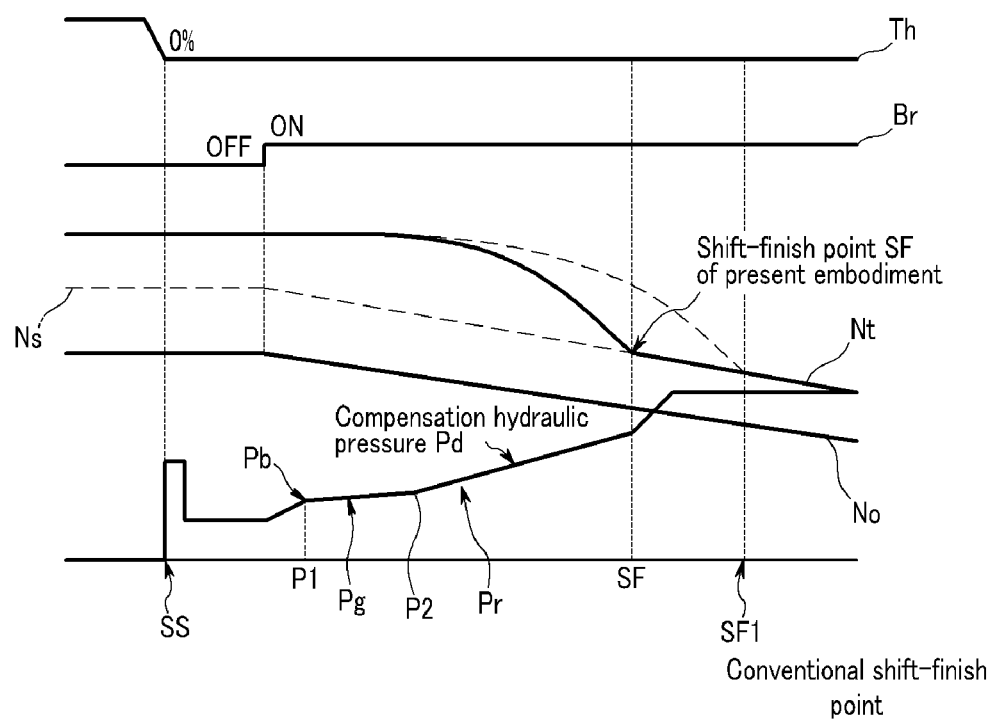
FIG. 1 illustrates a scheme of a method for compensating a hydraulic pressure of an automatic transmission according to an exemplary embodiment of the present invention.

SS: shift-start point SF: shift-finish point
SF1: shift-finish point of a conventional scheme.
Nt: turbine speed Th: throttle valve
No: output shaft rotation speed Pr: on-coming hydraulic pressure
P1: first time point P2: second time point
Ns: synchronization speed
dNo: deceleration rate of the vehicle
Pd: compensation hydraulic pressure
Pg: first-order slope hydraulic pressure It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

FIG. 1 illustrates a scheme of a method for compensating a hydraulic pressure of an automatic transmission according to an exemplary embodiment of the present invention.

As shown in FIG. 1, an opening of a throttle valve Th is zero percent (0%) at the shift-start (SS) point, since the accelerator pedal is in a lift-foot-up state. At this time if a brake Br is operated, the shifting operation is performed as follows.

The turbine speed Nt gradually decreases from the shift-start point SS.

An output shaft rotation speed No decreases after when a brake Br is operated, since the vehicle speed decreases by the braking operation.

An on-coming hydraulic pressure Pr that is supplied to at least an on-coming friction member (e.g., a clutch or a brake) in the automatic transmission increases for a predetermined period before the shift-finish point SF, that is, for a period from a first time point P1 to the shift-finish point SF.

In an exemplary embodiment of the present invention the on-coming hydraulic pressure Pr may be applied to an on-coming friction in the automatic transmission for a first pre-determined period and a second pre-determined period.

The first pre-determined period is a period between a first time point P1 and a second time point P2 wherein the on-coming hydraulic pressure Pr comprising a base hydraulic pressure Pb and a first-order slope hydraulic pressure Pg is linearly increased as explained below in detail.

The second pre-determined period is a period between the second time point P2 and the shift-finish point SF wherein the on-coming hydraulic pressure Pr may further be linearly or nonlinearly increased with a compensation hydraulic pressure Pd as explained below in detail.

Referring to FIG. 1, although the on-coming hydraulic pressure Pr for the second pre-determined period shows a linear increase, the present invention is not limited to the linear increase, but may extend to the nonlinear increase of hydraulic pressure.

Particularly, according to an exemplary embodiment, the increase rate of the on-coming hydraulic pressure Pr is increasingly changed at the second time point P2 and thus the pressure gradient of the on-coming hydraulic pressure Pr for the second predetermined period might be larger than the pressure gradient of the on-coming hydraulic pressure Pr for the first predetermined period.

At the shift-finish point SF where the turbine speed Nt meets the synchronization speed Ns, the on-coming hydraulic pressure Pr is controlled to rapidly increase to its maximum value such that the on-coming element may become fully and firmly engaged.

Because the pressure gradient of the on-coming hydraulic pressure Pr is increasingly changed at a second time point P2, the turbine speed Nt can more rapidly converge to the synchronization speed Ns that is decreasing due to the deceleration of the vehicle, rather than the turbine speed (dotted line) of the conventional scheme. Therefore, the shift-finish point SF can be achieved earlier than a conventional shift-finish point SF1 that is achieved by the conventional scheme.

That is, according to the exemplary embodiment, the turbine speed Nt can reach the synchronization speed Ns earlier than the conventional scheme (dotted line) due to the compensation hydraulic pressure Pd added to the on-coming hydraulic pressure Pr. In detail, in this embodiment, the turbine speed Nt can reach the synchronization speed Ns till the shift-finish point SF but the conventional scheme can reach the synchronization speed Ns till the shift-finish point SF1.

Furthermore, since the turbine speed Nt may be slowly synchronized to the synchronization speed Ns at the shift-finish point SF as shown in FIG. 1, the shift-shock that may occur at the shift-finish point SF may be substantially decreased than conventional scheme wherein the turbine speed Nt (dotted line) may be abruptly synchronized due to the lack of the compensation hydraulic pressure Pd.

The on-coming hydraulic pressure Pr according to the present exemplary embodiment may be expressed in the following equation 1.

$$Pr = Pb + Pg + Pd,  \quad \text{<equation 1>}$$

where Pb denotes a base hydraulic pressure,
Pg denotes a first-order slope hydraulic pressure, and
Pd denotes a compensation hydraulic pressure.

The base hydraulic pressure Pb is a hydraulic pressure that is calculated for the on-coming friction member, which is typically calculated according to a conventional scheme by a person or ordinary skill in the art, taking into account of vehicle specification. The base hydraulic pressure Pb is the hydraulic pressure applied to the on-coming friction member at the first time point P1 in this exemplary embodiment of the present invention.

The first-order slope hydraulic pressure Pg denotes the hydraulic pressure having a primary linear gradient to be applied to the on-coming friction member between the first time point P1 and the second P2 as shown in FIG. 1 and the primary linear gradient is also typically calculated according to a conventional scheme by a person of an ordinary skill in the art.

As shown in FIG. 1, the on-coming hydraulic pressure Pr increases after the first time point P1, because of the primary linear gradient of the first-order slope hydraulic pressure Pg.

Hereinafter, the compensation hydraulic pressure Pd according to an exemplary embodiment of the present invention is described in detail.

As shown in the above equation 1, according to the present exemplary embodiment, the on-coming hydraulic pressure Pr additionally includes the compensation hydraulic pressure Pd having a linear or nonlinear pressure gradient to be applied to the on-coming friction member between the second time point P2 and the shift-finish point SF as shown in FIG. 1 in contrast with the conventional scheme.

The on-coming hydraulic pressure Pr applied between the second time point P2 and the shift-finish point SF increases faster from the second time point P2 than the first-order slope hydraulic pressure Pg, because the pressure gradient of the compensation hydraulic pressure Pd is larger than the pressure gradient of the first-order slope hydraulic pressure Pg in this exemplary embodiment.

That is, since the compensation hydraulic pressure Pd is additively included in the calculation of the on-coming hydraulic pressure Pr, the on-coming hydraulic pressure Pr increases faster after than before the second time point P2.

The compensation hydraulic pressure Pd of the exemplary embodiment depends on a deceleration rate dNo (refer to the step S30 of FIG. 2) of the vehicle. That is, the compensation hydraulic pressure Pd (and accordingly, the on-coming hydraulic pressure Pr) increases as the deceleration rate of the vehicle increases. Therefore, more hydraulic pressure is applied when a higher braking power is applied to the vehicle since the deceleration rate of the vehicle is increased. Accordingly, the gradient of the compensation hydraulic pressure Pd might be increased linearly or nonlinearly, depending on the condition of the deceleration rate dNo of the vehicle.

As a result, the higher a compensation hydraulic pressure Pd between second time point P2 and the shift finish point SF is applied, the more rapidly the turbine speed Nt becomes converged to the synchronization speed Ns. Therefore, in this case, a required shifting operation is accelerated.

Furthermore, the shift-shock that may start to occur at the shift-finish point SF may be substantially decreased since the turbine speed Nt may be slowly synchronized to the synchronization speed Ns at the shift-finish point SF, as shown in FIG. 1, than conventional scheme that does not have the compensation hydraulic pressure Pd.

Figure 4:
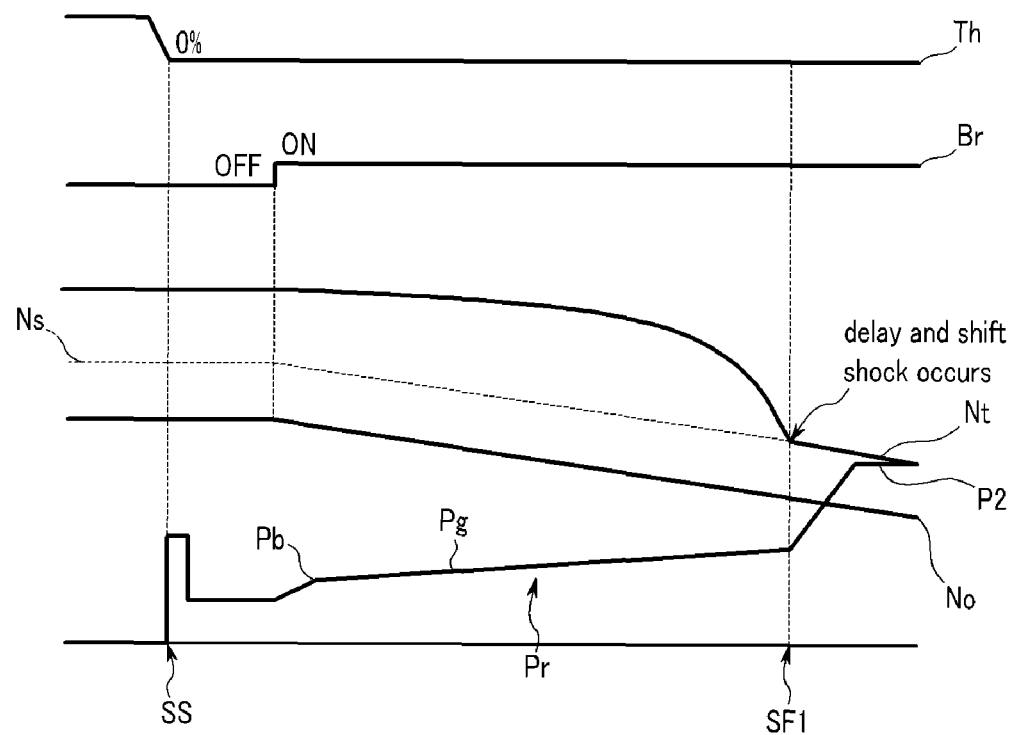
FIG. 4 illustrates a conventional scheme of a method for compensating a hydraulic pressure of an automatic transmission.

In contrast, referring to FIG. 4 illustrating a conventional scheme of a method for compensating a hydraulic pressure of an automatic transmission, a large shift shock may occur since the turbine speed Nt may be abruptly changed to the synchronization speed Ns at the shift-finish point SF1.

The compensation hydraulic pressure Pd may be applied immediately or in a predetermined time after the detection of deceleration dNo of the vehicle, where the predetermined time may be set as an appropriate value by a person or ordinary skill in the art taking into account of a vehicle specification or design factors.

In FIG. 1, it is shown that the second time point P2 where the application of the compensation hydraulic pressure Pd starts to be applied is in a certain time period after the operation of the brake, however, it should be understood that the present invention is not necessarily limited thereto.

Figure 2:
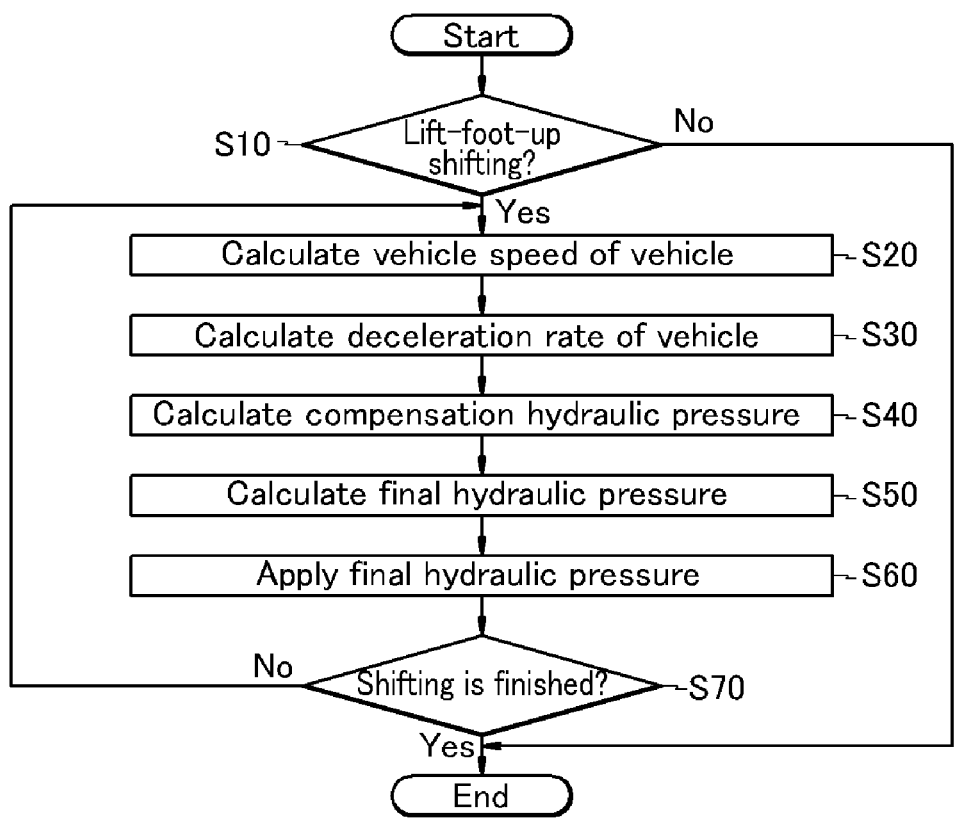
FIG. 2 is a flowchart that shows a method for compensating a hydraulic pressure of an automatic transmission according to an exemplary embodiment of the present invention.

FIG. 2 is a flowchart that shows a method for compensating a hydraulic pressure of an automatic transmission according to an exemplary embodiment of the present invention.

The method of the present embodiment may be implemented as a program in a transmission control unit (TCU), and the TCU can be realized by one or more processors activated by the program.

As shown in FIG. 2, according to a method for compensating a hydraulic pressure of an automatic transmission of the exemplary embodiment of the present invention, firstly at step S10, the TCU determines whether a lift-foot-up shifting request occurs. The lift-foot-up shifting request may be determined according to a conventional scheme.

When a lift-foot-up shifting request occurs, the TCU detects a vehicle speed of the vehicle at step S20. At the step S20, the calculation of the vehicle speed is achieved by detecting an output shaft rotation speed No of the automatic transmission, and then calculating the vehicle speed based on the detected output shaft rotation speed.

Then, at step S30, a deceleration rate dNo of the vehicle is calculated. At the step S30, the calculation of the deceleration rate dNo is achieved by detecting a rotation speed decrease rate of an output shaft of the automatic transmission, and then calculating the deceleration rate dNo of the vehicle based on the rotation speed decrease rate.

Subsequently at step S40, the TCU calculates the compensation hydraulic pressure Pd to be applied to at least an oncoming friction member that is engaged for a target shift-speed of the lift-foot-up shifting. At the step S40, the calculation of the compensation hydraulic pressure Pd is based on the deceleration rate dNo of the vehicle.

Subsequently at step S50, the TCU calculates an on-coming hydraulic pressure (Pr) to be applied to the friction member, according to the above equation 1.

Then, at step S60, the TCU applies the calculated on-coming pressure Pr to the lift-foot-up shifting that is currently under progress. The application of the on-coming pressure Pr to the shifting may be realized by controlling typical actuator unit that includes solenoid valves in the transmission.

Then, at step S70, the TCU determines whether the lift-foot-up shifting is finished. If the lift-foot-up shifting is not yet finished, the TCU returns to the step S20 such that the compensating of the hydraulic pressure may be maintained.

Figure 3:
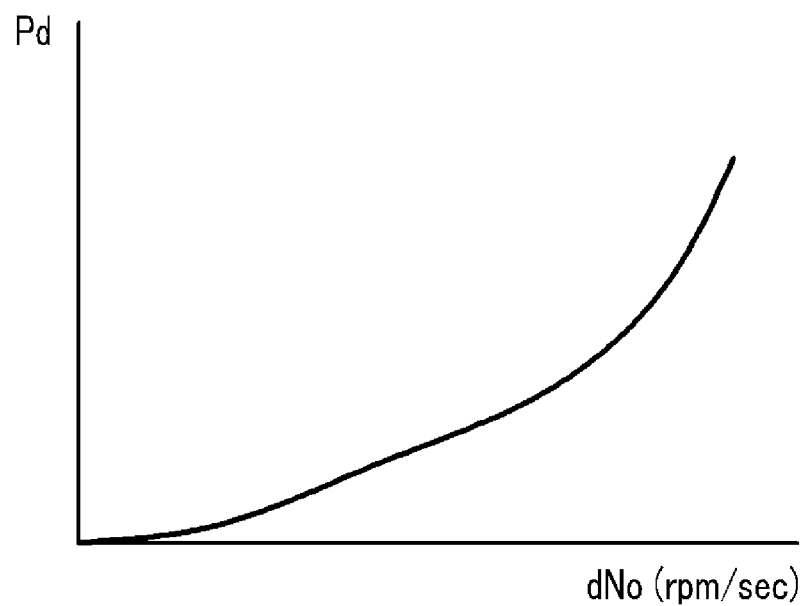
FIG. 3 is a graph that shows a compensation hydraulic pressure according to an exemplary embodiment of the present invention.

FIG. 3 is a graph that shows a compensation hydraulic pressure Pd according to an exemplary embodiment of the present invention.

In FIG. 3, the horizontal axis denotes the deceleration rate dNo of the vehicle and the vertical axis denotes the compensation hydraulic pressure Pd.

The deceleration rate dNo is obtained at the step S30, and the compensation hydraulic pressure Pd is calculated at the step S40 based on the deceleration rate dNo.

As shown in FIG. 3, the compensation hydraulic pressure Pd increases as the deceleration rate dNo increases. In more detail, the compensation hydraulic pressure Pd may increase linearly or nonlinearly as the deceleration rate dNo increases for example. That is, the compensation hydraulic pressure Pd increases higher as the vehicle speed is decreased faster. Therefore, the nonlinear function includes any other terms such as "monotonical function" as long as the results of those functions of the compensation hydraulic pressure Pd increases higher as the vehicle speed is decreased faster.

Accordingly, when the deceleration rate dNo of the vehicle is harder, which means the synchronization speed for the turbine speed is required to decrease faster during the lift-foot-up shifting, the hydraulic pressure to be applied to the on-coming friction element is adjusted by higher hydraulic compensation value, and thus, the turbine speed may converge to the synchronization speed faster with a reduced shift-shock.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the claims appended hereto and their equivalents.

What is claimed is:

1. A method for compensating a hydraulic pressure of an automatic transmission, comprising:
   determining whether a lift-foot-up shifting of the automatic transmission is under control;
   determining whether a brake is operated;
   calculating a vehicle speed of a vehicle;
   wherein the calculating of the vehicle speed comprises:
      detecting an output shaft rotation speed of the automatic transmission; and
      calculating the vehicle speed based on the detected output shaft rotation speed;
   calculating a deceleration rate of the vehicle during the lift-foot-up shifting;
   calculating a compensation hydraulic pressure to be applied to at least a friction member of the transmission, based on the deceleration rate of the vehicle;
   calculating an on-coming hydraulic pressure based on the calculated compensation hydraulic pressure; and
   applying the calculated on-coming hydraulic pressure to the friction member immediately or in a predetermined time after the detection of the deceleration rate of the vehicle.

2. The method of claim 1, wherein the on-coming hydraulic pressure is determined by summation of a base hydraulic pressure, a first-order slope hydraulic pressure and the compensation hydraulic pressure.

3. The method of claim 1, wherein the calculating of the deceleration rate of the vehicle comprises:
   detecting a rotation speed decrease rate of an output shaft of the automatic transmission; and
   calculating the deceleration rate based on the rotation speed decrease rate.

4. The method of claim 1, wherein the friction member is a hydraulic clutch or a hydraulic brake provided in the automatic transmission.

5. The method of claim 1, wherein the compensation hydraulic pressure increases as the deceleration rate of the vehicle increases.

6. The method of claim 5, wherein the compensation hydraulic pressure linearly increases as the deceleration rate of the vehicle increases.

7. The method of claim 6, wherein the compensation hydraulic pressure nonlinearly increases as the deceleration rate of the vehicle increases.

8. The method of claim 6 or 7, wherein the compensation hydraulic pressure monotonically increases as the deceleration rate of the vehicle increases.

* * * * *